(12) United States Patent
Shiau et al.

(10) Patent No.: US 12,378,136 B2
(45) Date of Patent: Aug. 5, 2025

(54) FLOW-THROUGH FILTRATION AND WASTE SEPARATION DEVICE

(71) Applicants: Shi-En Shiau, Scottsdale, AZ (US); Brian Chia-Huan Shiau, Scottsdale, AZ (US)

(72) Inventors: Shi-En Shiau, Scottsdale, AZ (US); Brian Chia-Huan Shiau, Scottsdale, AZ (US)

( * ) Notice: Subject to any disclaimer, the term of this patent is extended or adjusted under 35 U.S.C. 154(b) by 0 days.

(21) Appl. No.: 17/753,266

(22) PCT Filed: Sep. 7, 2021

(86) PCT No.: PCT/US2021/049215
§ 371 (c)(1),
(2) Date: Feb. 25, 2022

(87) PCT Pub. No.: WO2022/139893
PCT Pub. Date: Jun. 30, 2022

(65) Prior Publication Data
US 2025/0136470 A1    May 1, 2025

Related U.S. Application Data
(60) Provisional application No. 63/205,517, filed on Dec. 21, 2020.

(51) Int. Cl.
*B01D 33/70* (2006.01)
*B01D 33/72* (2006.01)
(Continued)

(52) U.S. Cl.
CPC .............. *C02F 1/004* (2013.01); *B01D 33/70* (2013.01); *B01D 33/72* (2013.01); *C02F 11/126* (2013.01);
(Continued)

(58) Field of Classification Search
CPC .. C02F 1/004; C02F 11/126; C02F 2103/007; C02F 2303/20; C02F 2303/24;
(Continued)

(56) References Cited

U.S. PATENT DOCUMENTS

| 4,836,917 A | * | 6/1989 | Tomita | ................. B01D 33/466 |
| | | | | 210/402 |
| 5,246,600 A | * | 9/1993 | Reichner | .............. B01D 33/466 |
| | | | | 210/396 |

(Continued)

FOREIGN PATENT DOCUMENTS

| CN | 201832460 U | * | 5/2011 | ............. B01D 24/46 |
| CN | 104671353 | | 6/2015 | |

(Continued)

OTHER PUBLICATIONS

English translation of Patent Publication CN 201832460U, May 18, 2011. (Year: 2011).*

(Continued)

*Primary Examiner* — Joseph W Drodge
(74) *Attorney, Agent, or Firm* — Venjuris, P.C.

(57) ABSTRACT

The invention is a flow-through flow-through filter that can separate raw water and/or sewage to filtered stream, fine particle stream and grit stream in one hydraulic device. For raw lake and/or canal water intake application, the flow-through filter is placed inside a chamber box that is mounted on a water intake rack structure or diversion canal. The invention filters debris and organisms to prevent biomes formation in pumps and waterlines that delivers raw water to a water treatment plant. The flow-through filter withdraws flows from a raw water body without taking defined sediment, floating debris and target aquatic biomes and eliminates the need of discharging remnants to a sewage system. For wastewater treatment, the flow-through filter is installed over a wet well after the headwork rack and may replace the (Continued)

*Illustrates a side view of a filtration device embodiment* grit removal, primary clarifier, and the fine screening. The flow-through filter requires a much smaller footprint of the area and/or enclosed building that requires smaller odor control. There is a substantial cost saving of using one device and replaces grit removal, primary basin, and fine screening.

15 Claims, 16 Drawing Sheets

(51) Int. Cl.
    *C02F 1/00*         (2023.01)
    *C02F 11/12*       (2019.01)
    *C02F 11/126*     (2019.01)
    *E02B 3/02*         (2006.01)
    *C02F 103/00*     (2006.01)

(52) U.S. Cl.
    CPC .......... *E02B 3/02* (2013.01); *C02F 2103/007* (2013.01); *C02F 2303/20* (2013.01); *C02F 2303/24* (2013.01)

(58) Field of Classification Search
    CPC ...... B01D 33/06; B01D 33/073; B01D 33/11; B01D 33/44; B01D 33/468; B01D 33/70; B01D 33/72; B01D 33/74; B01D 33/80; B01D 35/027; B01D 35/0273; E02B 3/02; E02B 3/023; E02B 15/00; E02B 15/08
    See application file for complete search history.

(56) References Cited

U.S. PATENT DOCUMENTS

| | | |
|---|---|---|
| 5,944,998 A | 8/1999 | Rolchigo et al. |
| 8,894,866 B1 * | 11/2014 | Belasco ............... E03F 5/10 210/170.03 |
| 10,626,579 B1 * | 4/2020 | Hughes ............... E03B 1/041 |
| 2003/0127376 A1 | 7/2003 | Maddock et al. |
| 2009/0255868 A1 * | 10/2009 | Allen, II ............... C02F 3/32 210/170.03 |
| 2013/0043179 A1 | 2/2013 | Bugg |
| 2017/0326478 A1 * | 11/2017 | Noling ............... B01D 29/56 |
| 2018/0093211 A1 * | 4/2018 | Takahashi ............... B01D 46/24 |
| 2021/0147254 A1 * | 5/2021 | Figola ............... C02F 1/004 |

FOREIGN PATENT DOCUMENTS

| | | | | |
|---|---|---|---|---|
| CN | 107744683 A * | 3/2018 | ........ | B01D 33/073 |
| EP | 0062628 B1 * | 4/1982 | ........ | B01D 33/11 |
| GB | 2141039 | 12/1984 | | |
| WO | WO-2020005950 A1 * | 1/2020 | ........ | B01D 33/067 |

OTHER PUBLICATIONS

English translation of Patent Publication EP 0062628, Sep. 19, 1984. (Year: 1984).*
English translation of Patent Publication Cn 107744683A, Mar. 2, 2018. (Year: 2018).*
Kari Rodriquez, International Search Report and Written Opinion, PCT application PCT/US/2021/070310 (Dec. 14, 2021).
Slawski Magali P, International Preliminary Report on Patentability, PCT application PCT/US/2021/049215 (Jan. 9, 2024).

* cited by examiner

*Fig. 1A - Example of quagga Mussel*
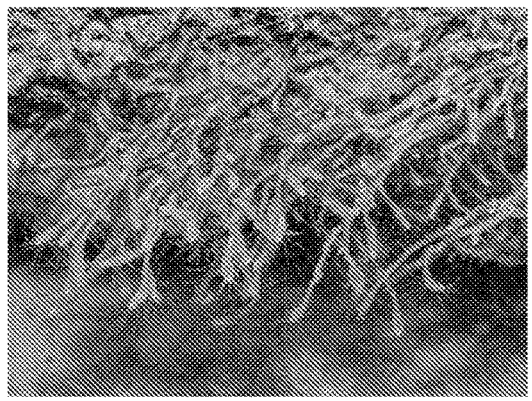
*Fig. 1B - Example of Colonial Hydroids*
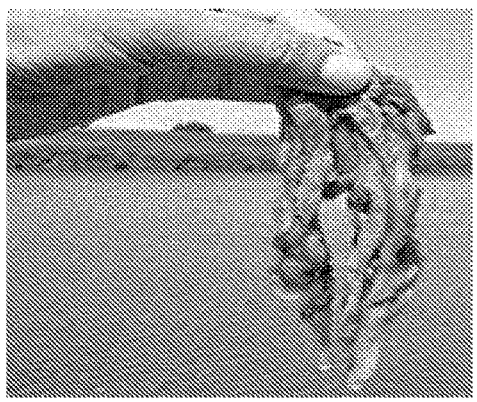
*Fig. 1C - Example of Didymo (Rock Snot)*
*Fig. 1D - Example of floating rock snot*
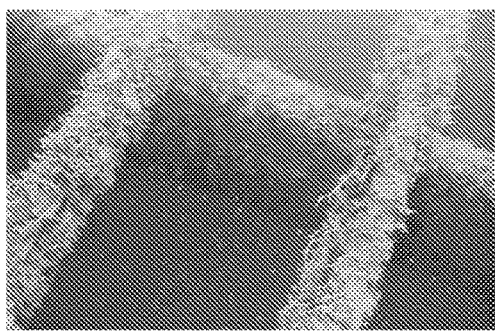
*Fig. 1E – Example of colonial hydroids on inlet Grate*

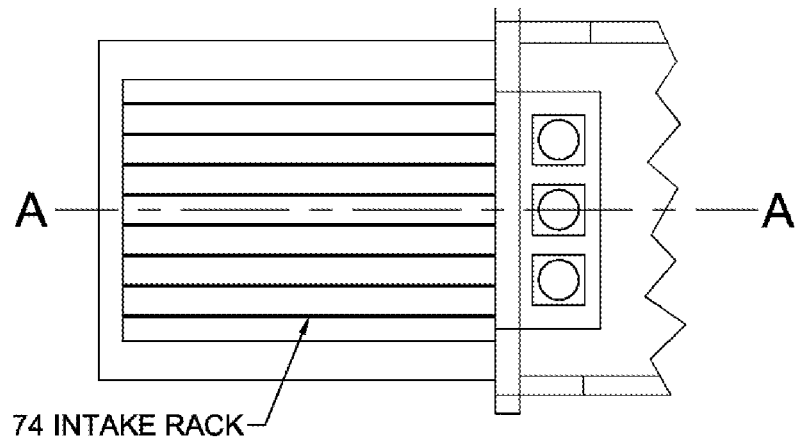
*Fig. 2 – Example of a typical canal raw water intake – plan view*
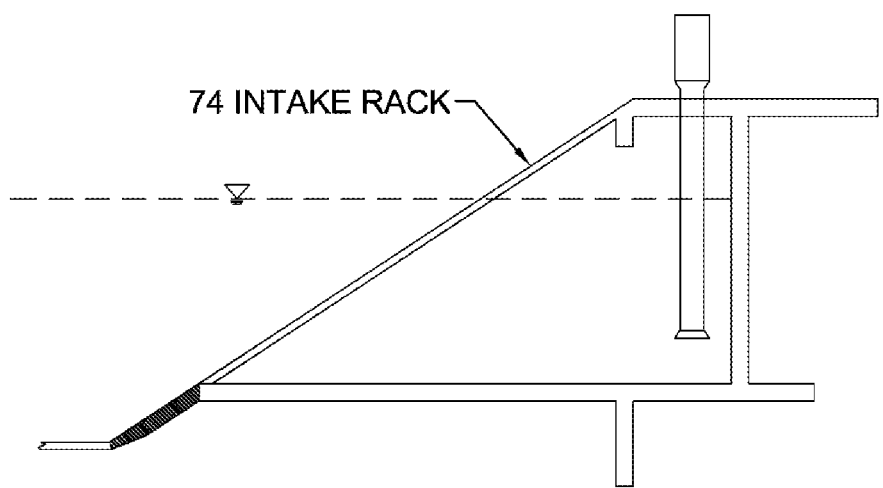
*Fig. 3 Example of a typical canal raw water intake (Fig. 2, section A-A)*

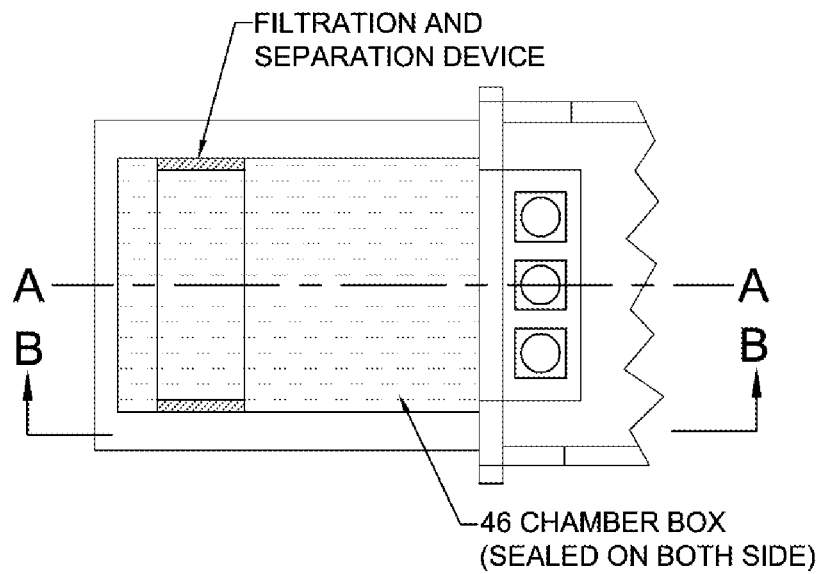
*Fig. 4 Illustrates the invention mounted on a typical raw water intake – plan view*
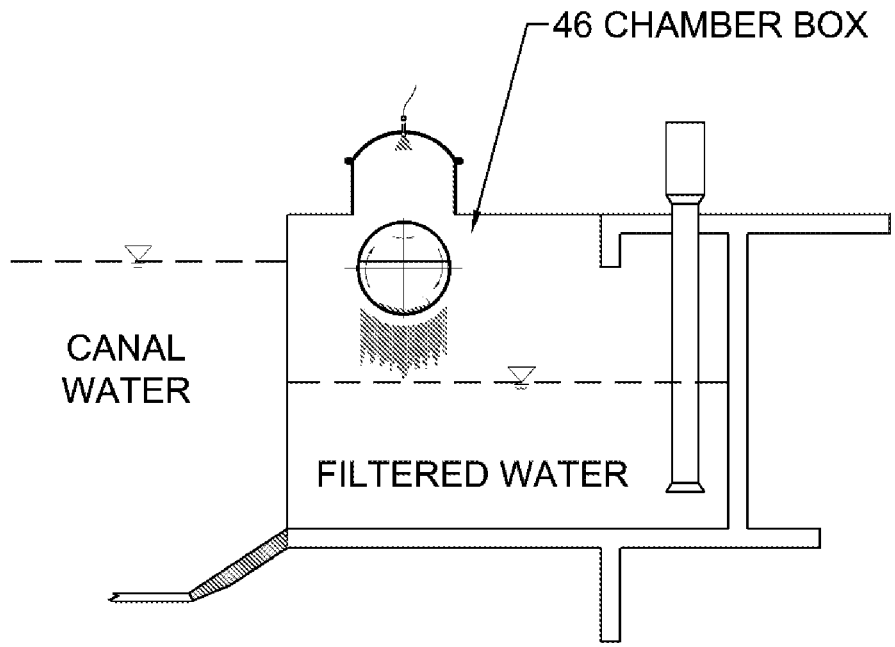
*Fig. 5 Illustrates the invention mounted on a chamber box in operation (Fig. 4, section A-A).*

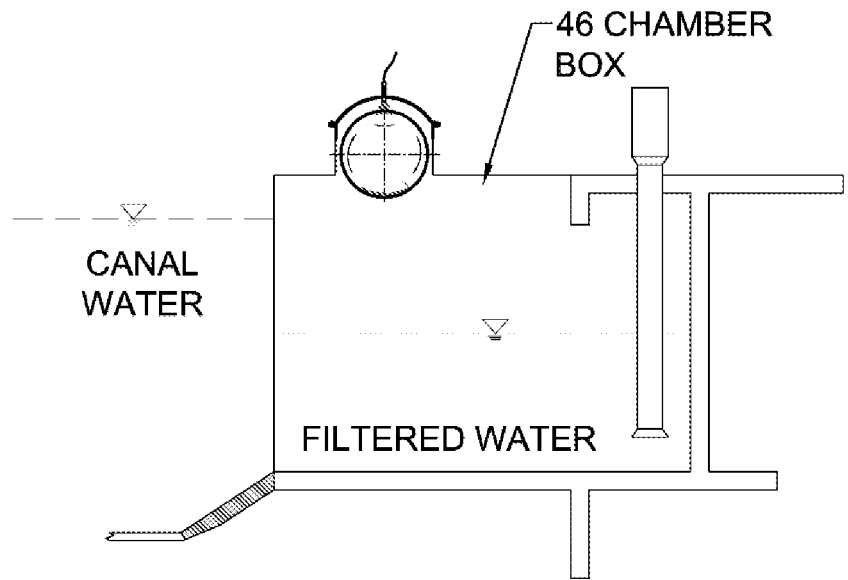
*Fig. 6 Illustrates the invention mounted on a chamber box is raised up for maintenance (Fig. 4, section A-A).*
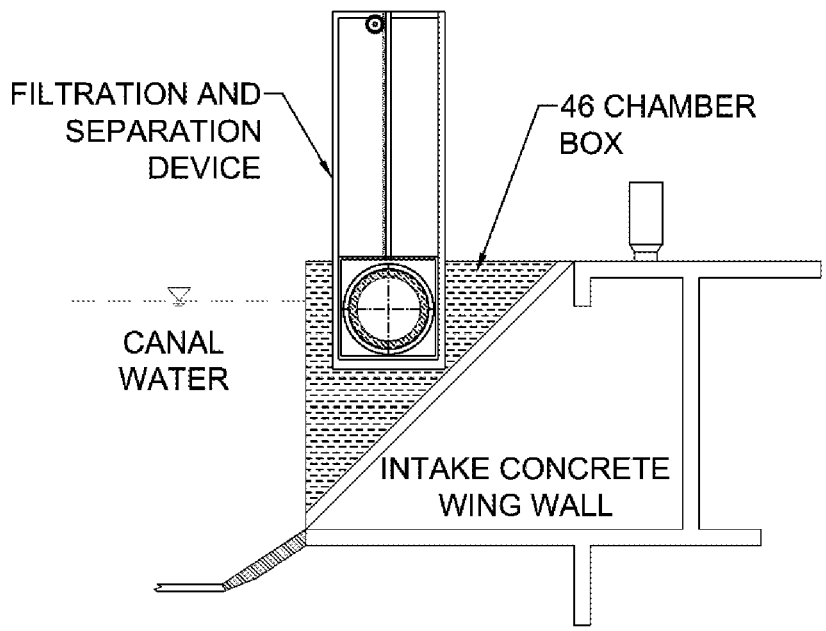
*Fig. 7 illustrates an end view (section B-B of Fig. 4) of a filtration device embodiment mounted on a chamber.*

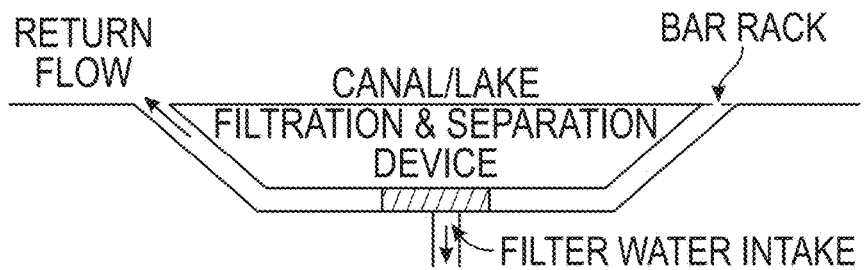
Figure 8 illustrates a plan view of a device mounted on a diversion channel
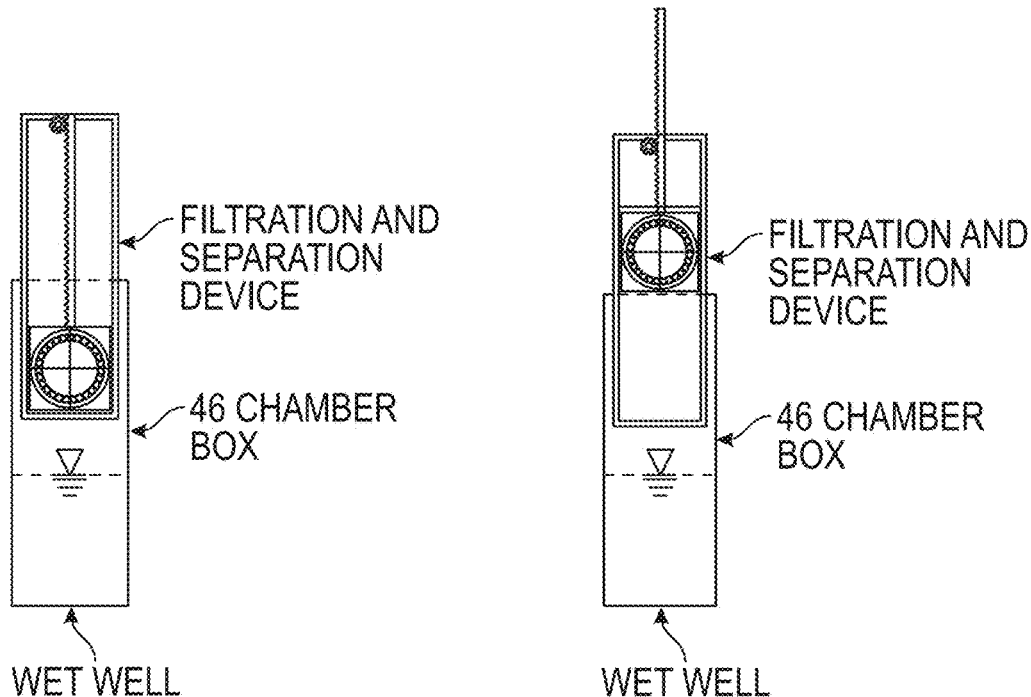
Figure 9 illustrates an end view of a filtration device embodiment in operation
Figure 10 illustrates an end view of a filtration device embodiment raised up for maintenance.

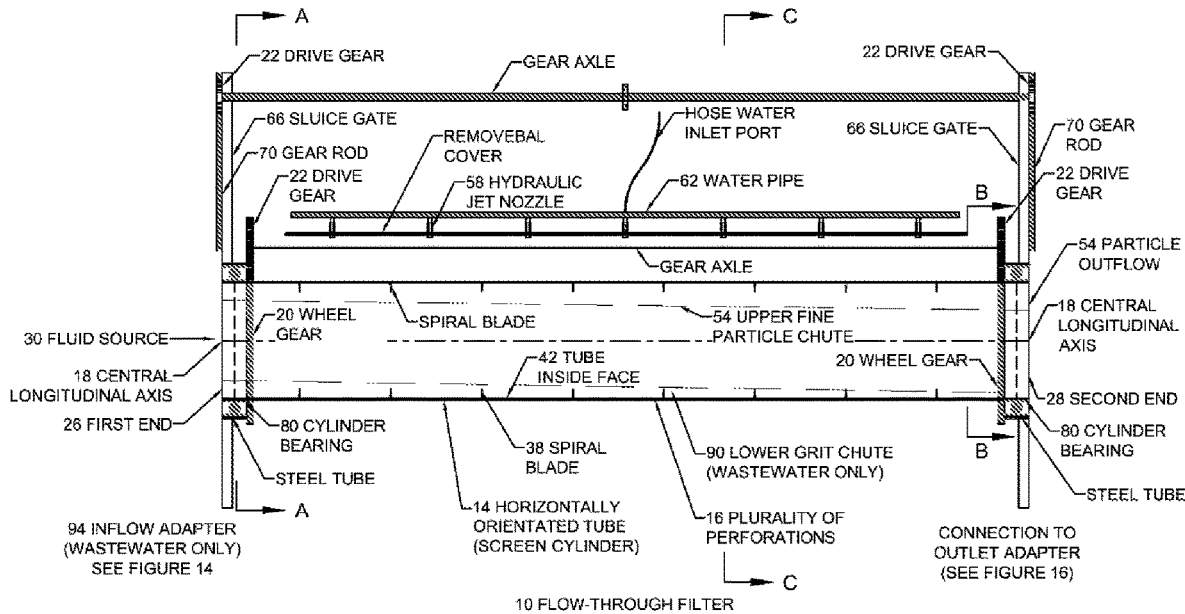
*Figure 11 illustrates a side view of a filtration device embodiment*
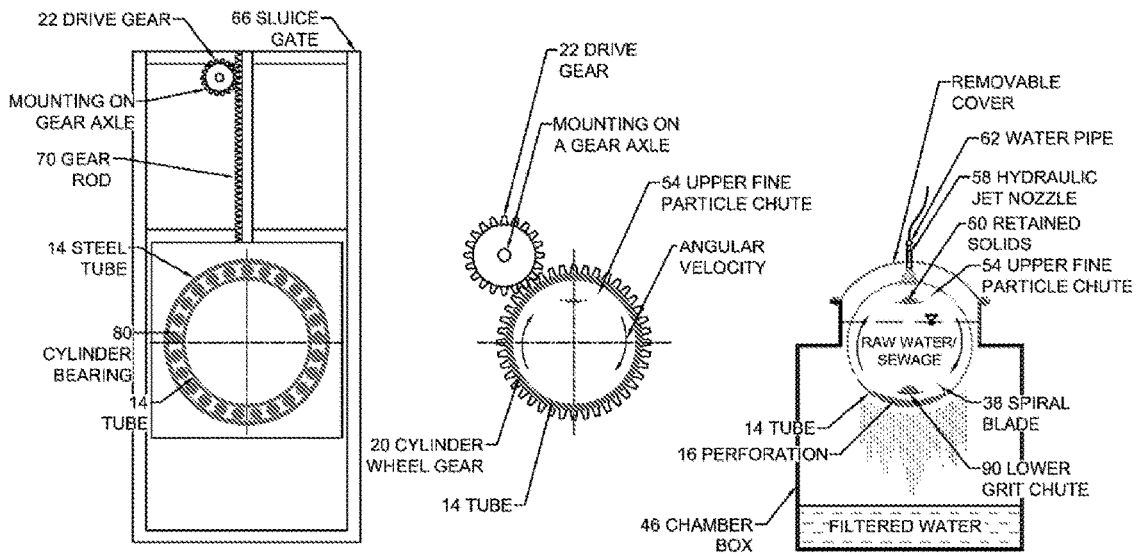
*Figure 12 illustrates cross view of sections designated on Fig. 11.*

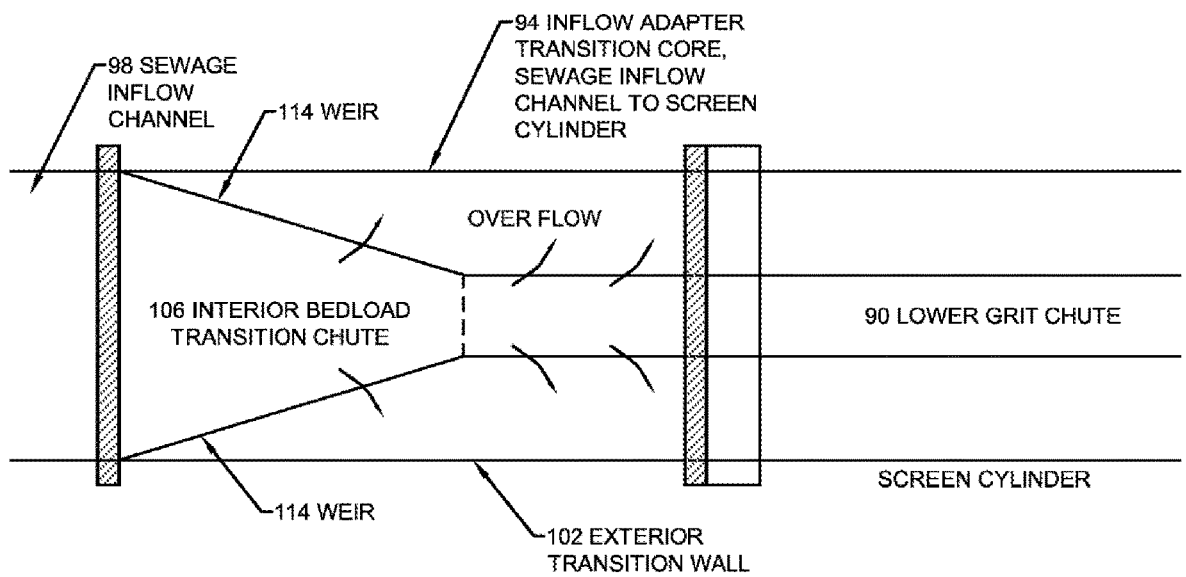
Figure 13 illustrates a plan view of wastewater inflow adapter embodiment
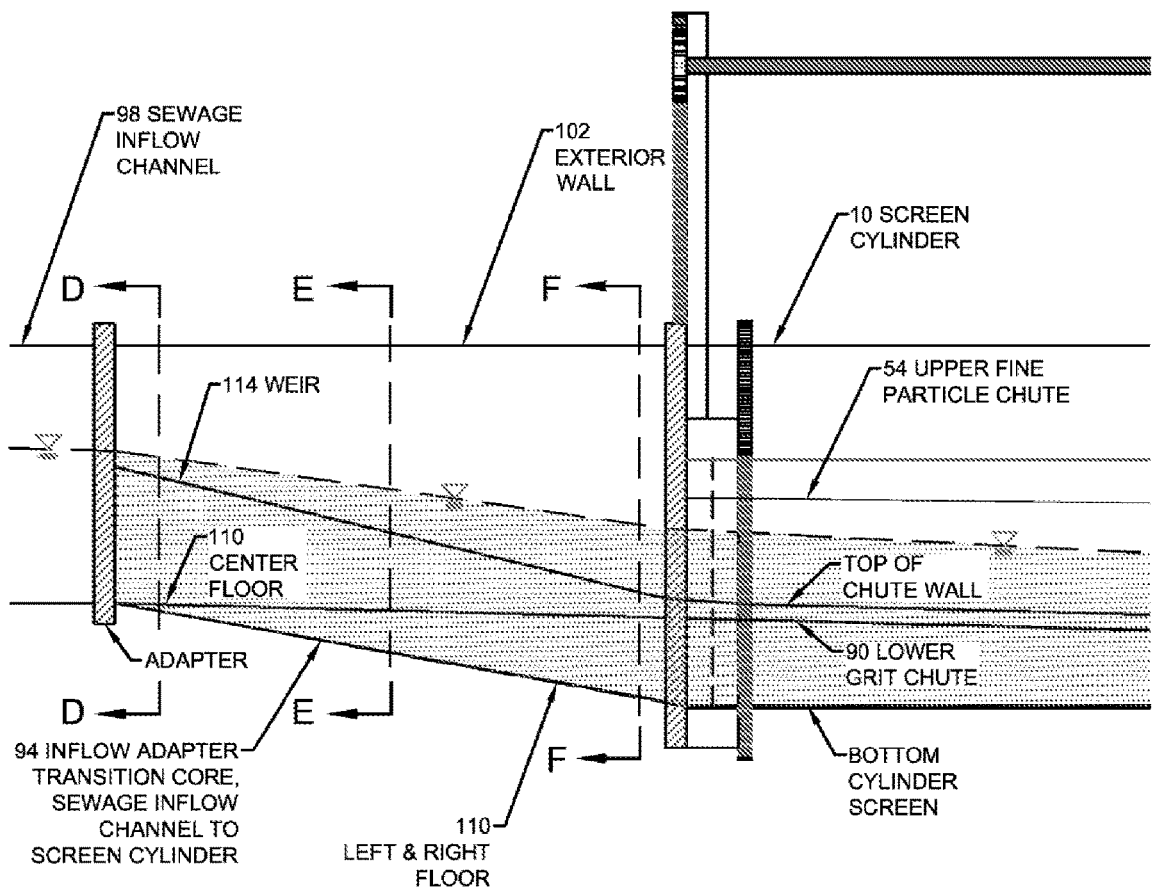
Figure 14 illustrates longitudinal view of wastewater inflow adapter embodiment

FIGURE 14, SECTION D-D

FIGURE 14, SECTION E-E

FIGURE 14, SECTION F-F

*Figure 15 illustrates cross view of the sections designated on Fig. 14*

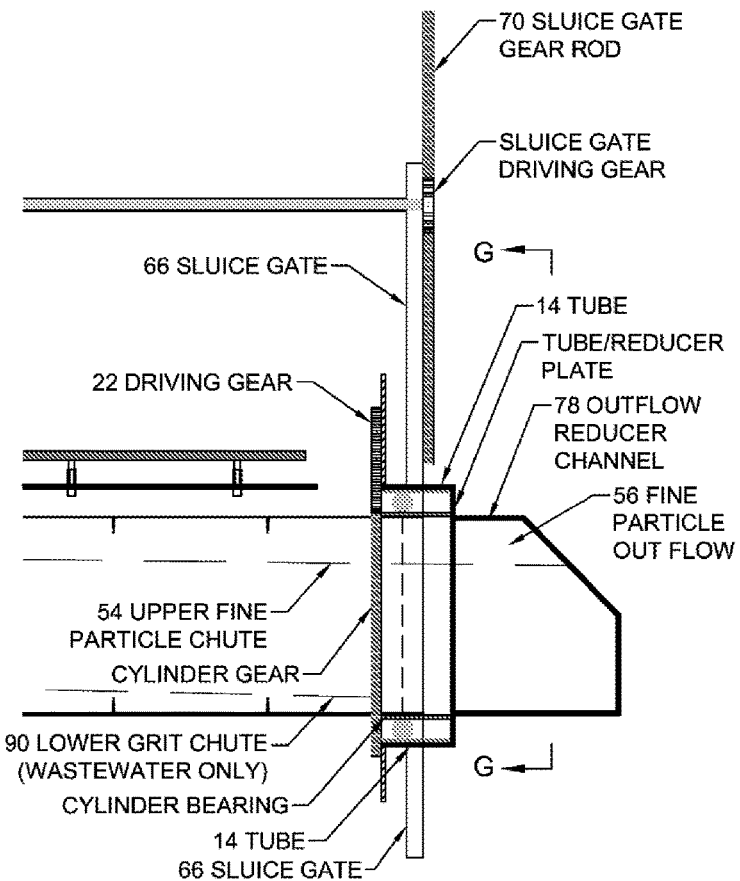
*Figure 16 illustrates an embodiment of a screen cylinder outflow adapter*
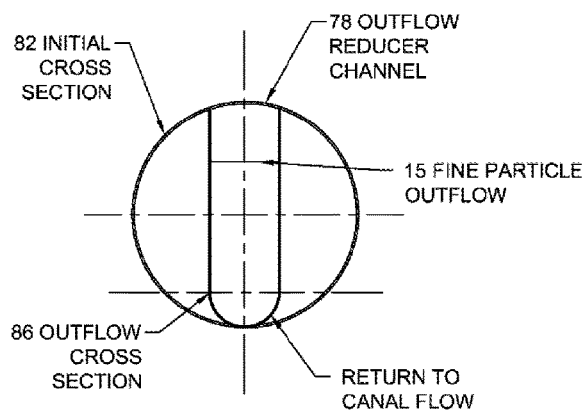
FIG. 15 G-G
23 RAW WATER OUTFLOW REDUCER
*Figure 17 illustrates an embodiment of a raw water outflow reducer*
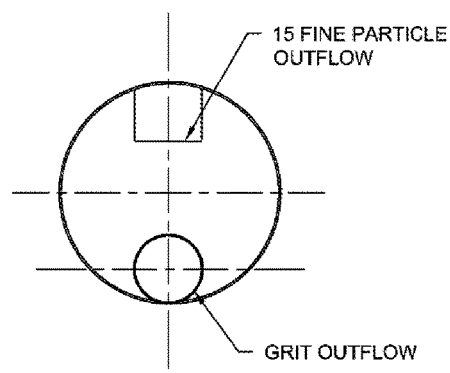
24 WASTE WATER OUTFLOW REDUCER
*Figure 18 illustrates an embodiment of a wastewater outflow reducer*

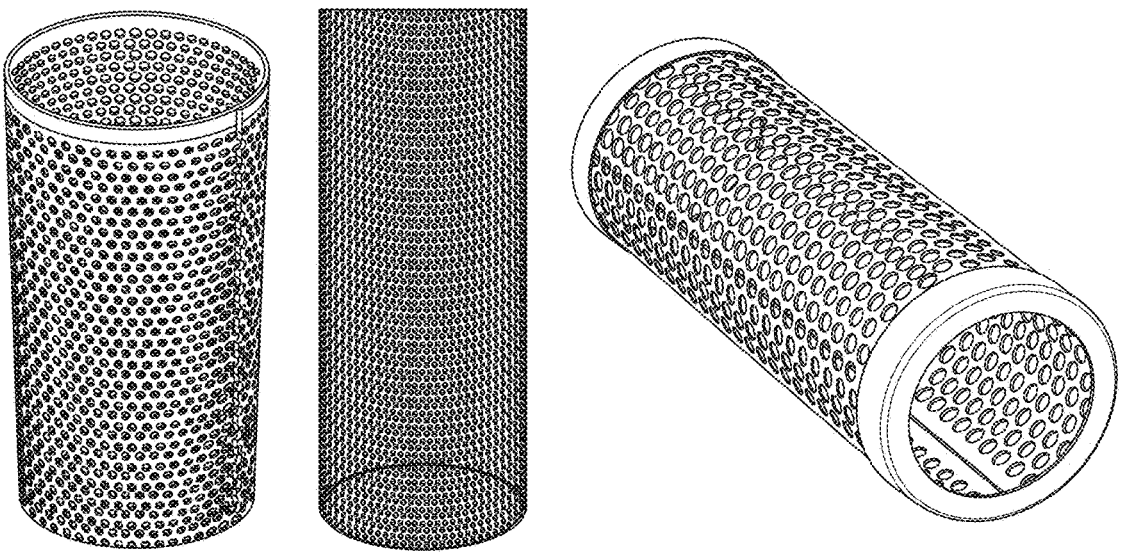
Figure 19 illustrates various embodiments of a perforated stainless steel screen cylinder
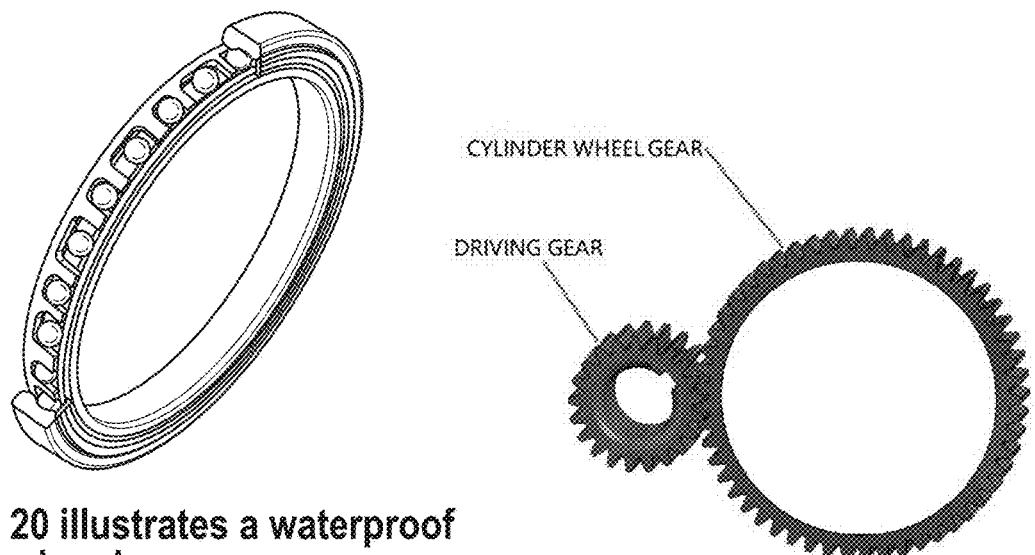
Figure 20 illustrates a waterproof cylinder bearing
Figure 21 illustrates a cylinder gear and driving gear

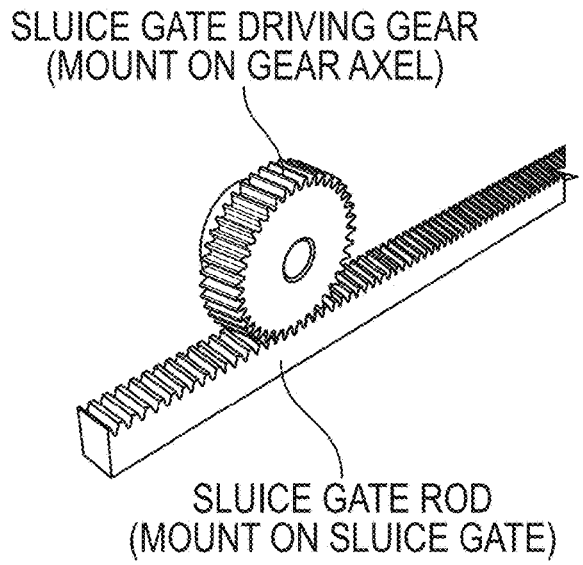
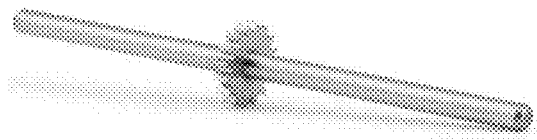
Figure 22 illustrates a sluice gate gear rod and driving gear
Figure 23 illustrate a gear Axle
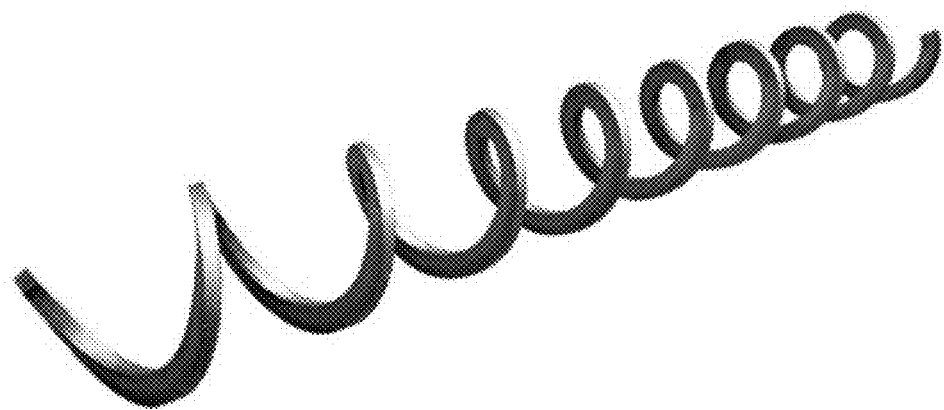
Figure 24 Illustrate a stainless steel Rotating helical spiral blade
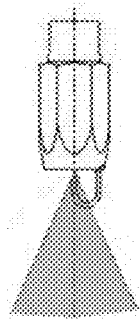
Figure 25 Illustrate a hydraulic nozzle injector

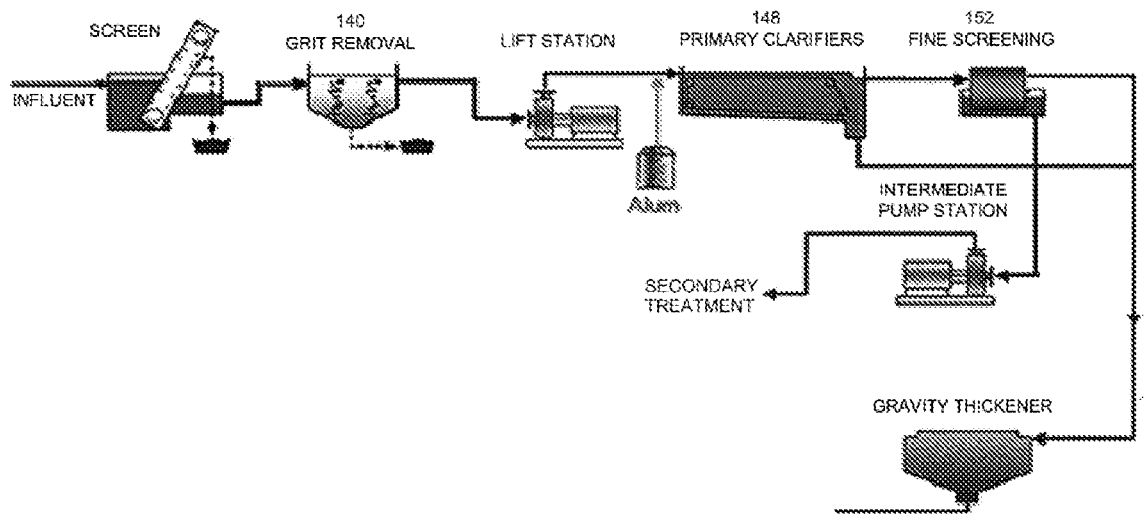
*Figure 26A illustrates a flow diagram of a conventional wastewater treatment*
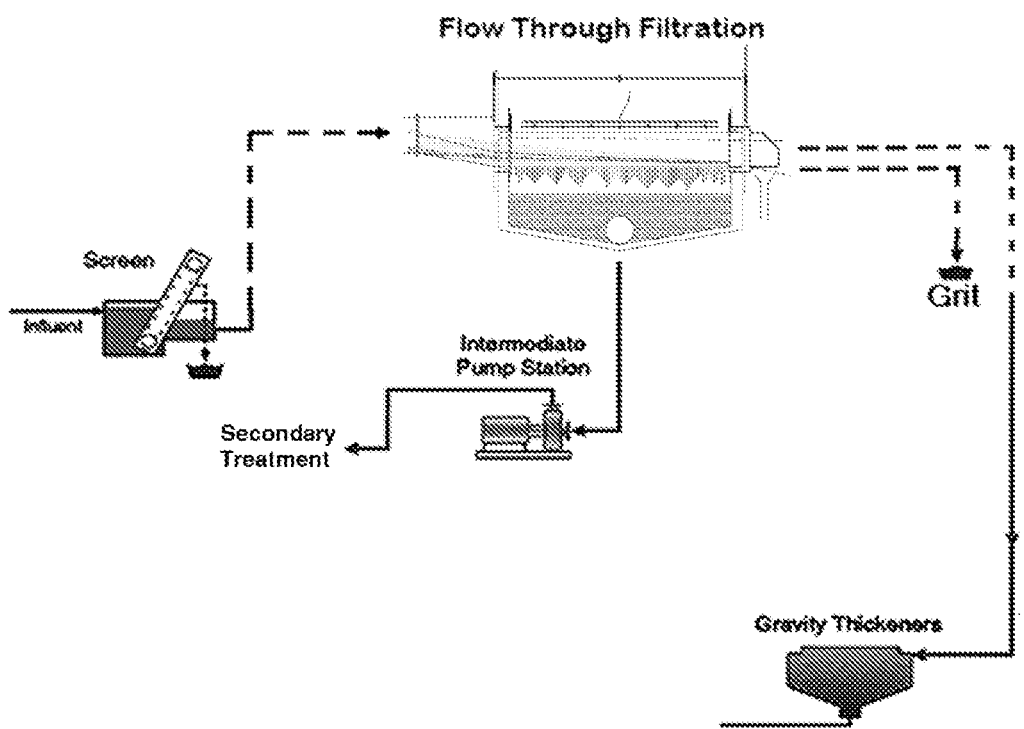
*Figure 26B illustrates a flow diagram of an embodiment of the invention installed in a wastewater treatment application.*

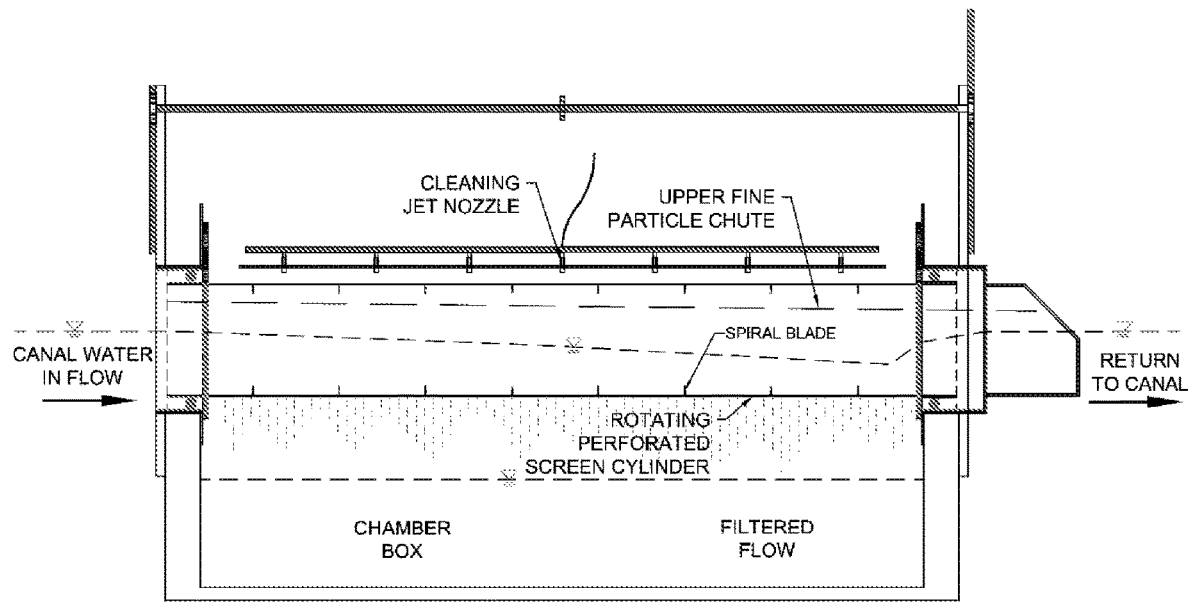
*Figure 27 – Illustrates an embodiment mounted on a raw water canal intake structure*
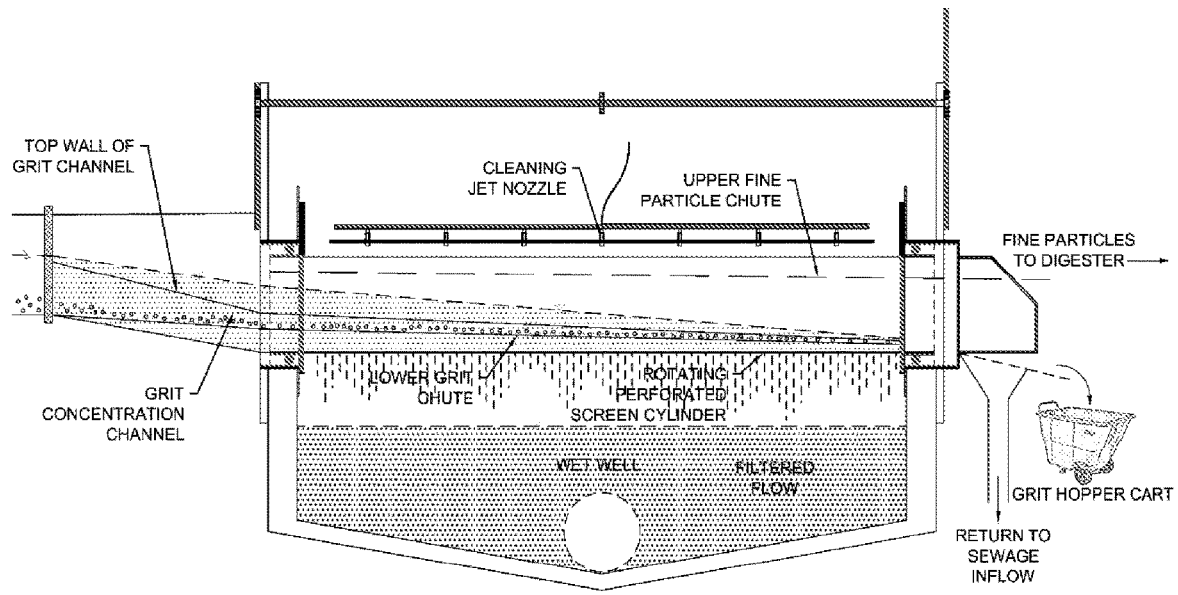
*Figure 28 – Illustrates an embodiment mounted on a wastewater well*

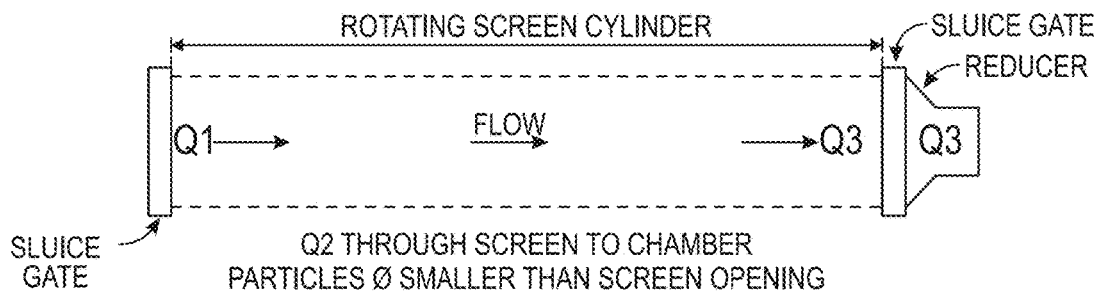
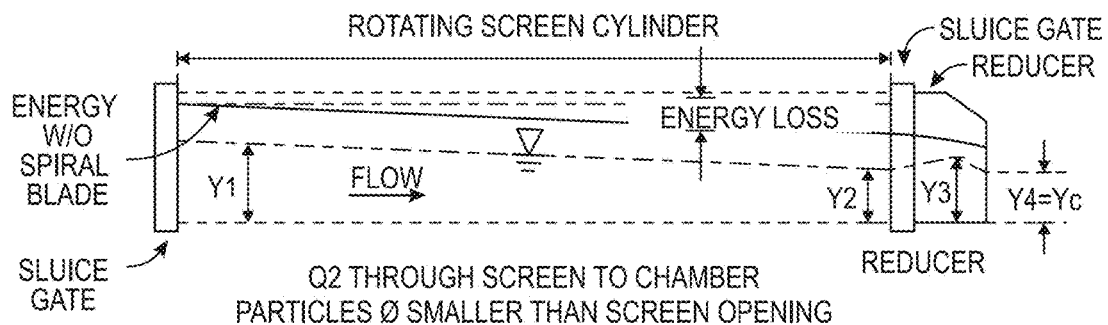
Figure 29 illustrates an embodiment of a hydraulic profile of a rotation screen cylinder with no backwater
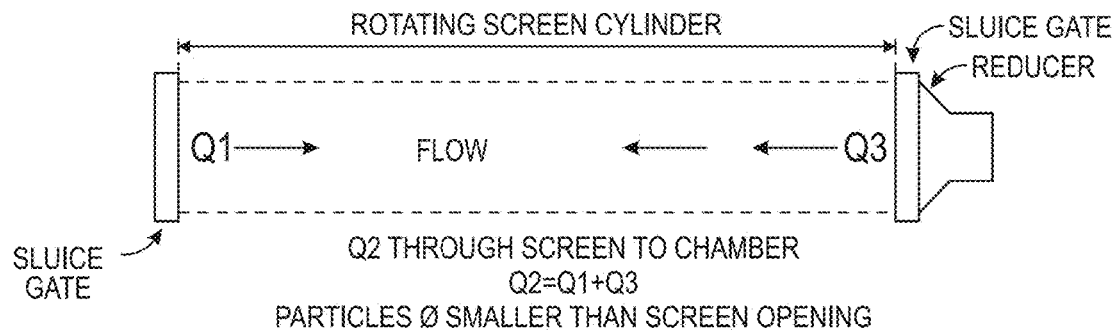
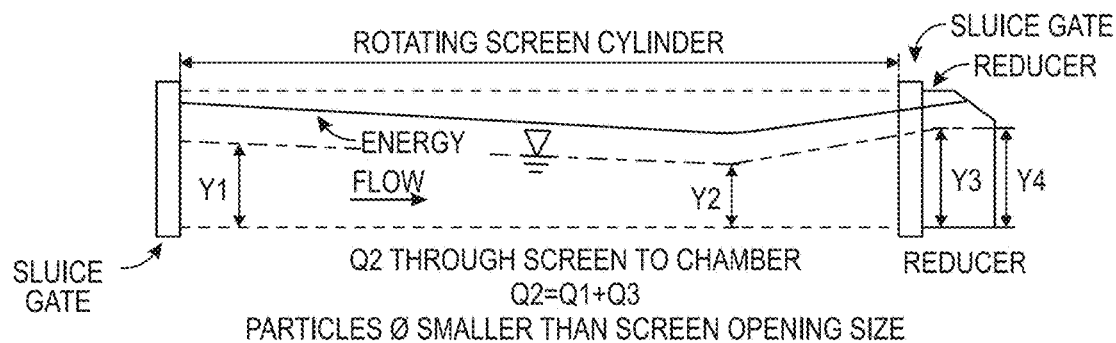
Figure 30 - illustrates an embodiment of a hydraulic profile of a rotation screen cylinder with outlet to downstream canal

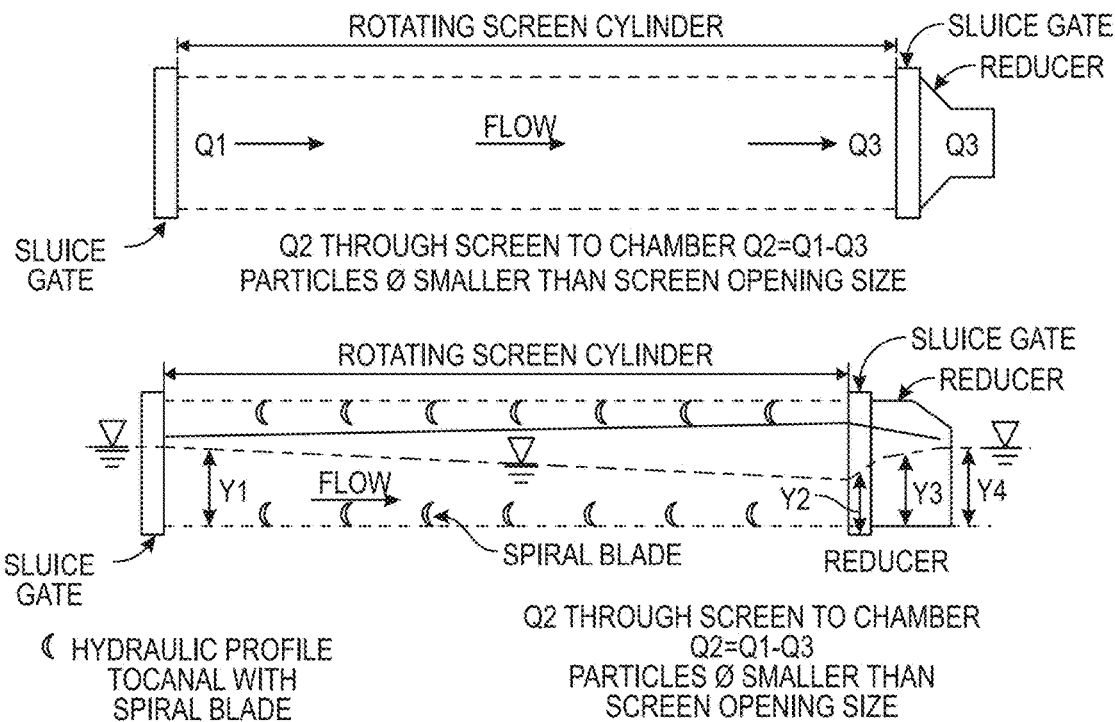
Figure 31 illustrates an embodiment of a hydraulic profile of a rotation screen cylinder with spiral blade and outlets to downstream canal
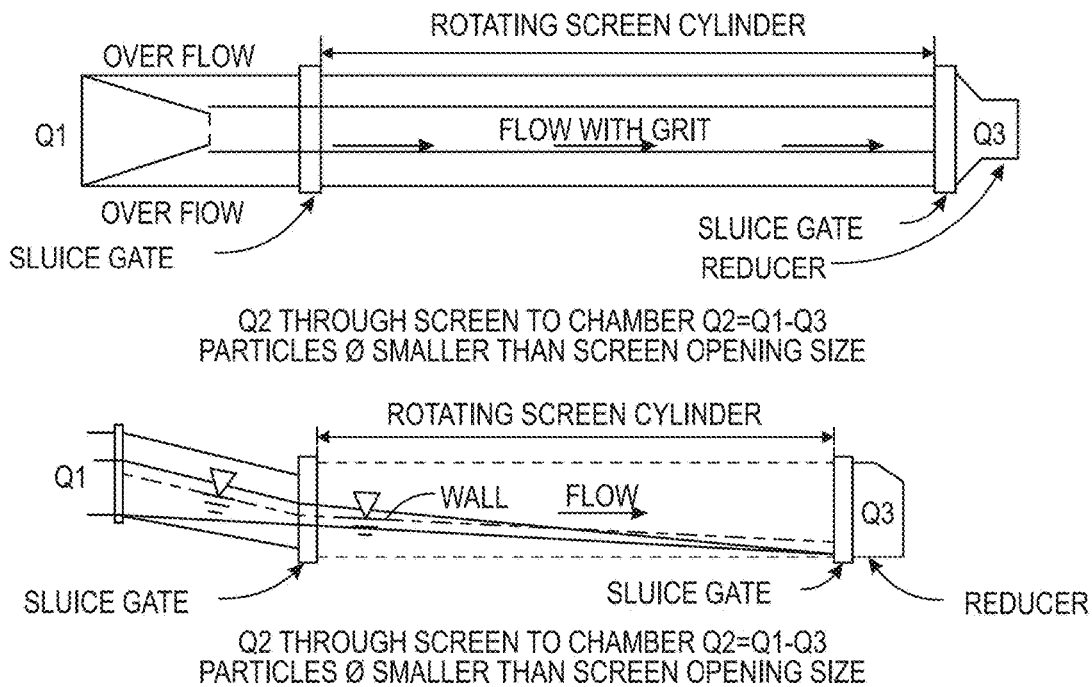
Figure 32 illustrates an embodiment of a hydraulic profile of a rotation screen cylinder over a wet well

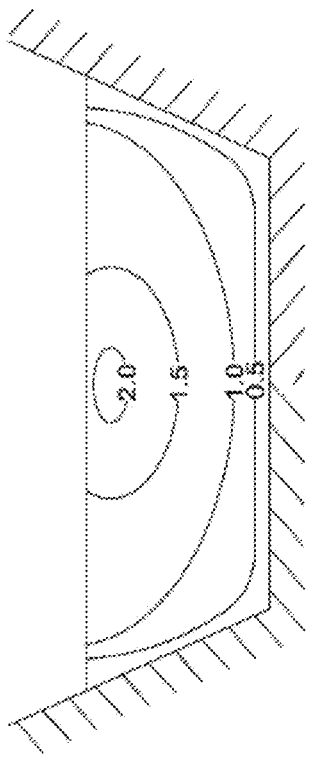
Figure 33 - illustrates an embodiment of a canal water flow velocity distribution
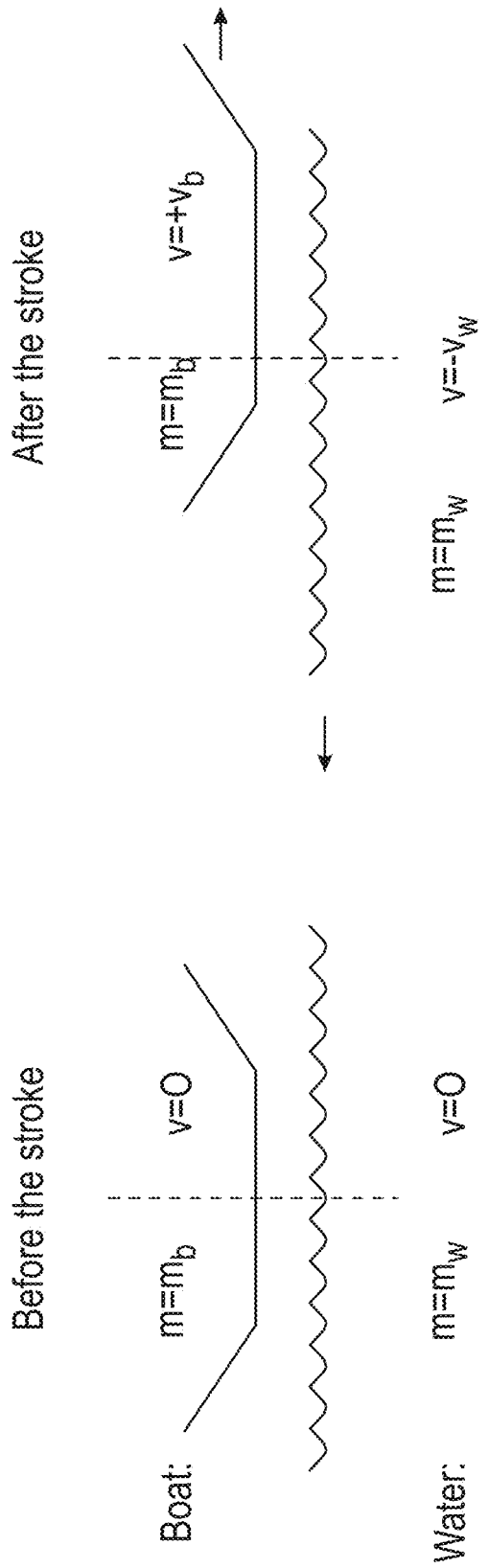
Figure 34 - illustrates an embodiment of a blade impulse to row stroke

FLOW-THROUGH FILTRATION AND WASTE SEPARATION DEVICE

FIELD OF THE INVENTION

The present invention relates to solutions for treating water and wastewater. More specifically, this invention relates to solutions for separating water and wastewater into a plurality of streams: including filtered, fine particle and grit.

BACKGROUND

Moving raw water and sewage contain (1) soluble particles, (2) bed load particles, (3) floating particles, and (4) suspended particles. Current common practice requires three separate processes to remove three types of particles. Soluble particles are removed through advanced water treatment (soluble particle removal is not addressed by this invention). Bed load particles are traditionally handled through grit removal. Floating particles and suspended particles are traditionally handled by settling in a primary basin (or clarifier) and followed by fine screening.

Under current common travelling screen practice, water flows from outside of the screen into inside of the screen cylinder for filtration. Most regulatory requires the extracted cannot be returned to the withdrawing water source. Water, sedimentary particles, fish, and other aquatic organisms that are taken out of a canal, when the canal water is extracted for filtering, cannot be returned to the canal. Therefore, additional backwash water systems must be built to house the remnants that cannot be returned to the original water system.

Raw water is water found in an environment that has not been treated so that minerals, ions, particles, bacteria, or parasites are still present. Raw water includes, but is not limited to: rainwater, ground water, water from infiltration wells, and water from bodies like lakes, rivers, and canals. Raw water is generally unsafe for human consumption due to the presence of contaminants that can result in major health problems. Therefore, raw water from lakes, rivers and canals must be collected and transported to a water treatment plant.

Water treatment plants remove minerals, ions, particles, bacteria, and parasites However, the raw water must first go through the intake racks, screens, pumps and transmission main. The intake process, floating debris and aquatic organisms can clog the intake rack, screens, and pumps. Debris and organisms in raw water environments include fish, vegetation, insects, and some invasive species. The most prominent organisms that have significant impact on intake screens and pumps are quagga mussels (see FIG. 1A), colonial hydroids (cordylophora caspia, FIG. 1B), and Didymo (rock snot, FIG. 1C). These organisms forming floating biomes (FIG. 1D) or resident biomes (FIG. 1E) cause clog that damage the pumps and cause the pumps to consume excessive energy. Cleaning and removing the aquatic organisms from the intake screens and pumps is tedious, time consuming, disrupt operations, and expensive.

Current practice for raw water filtration of debris and organisms to prevent biomes formation in pumps and waterline that delivers raw water to a water treatment plant include the following:

1) Traveling water screens are most widely used for removing debris but are incapable of removing aquatic organisms.
2) Pressurized filtration systems are setup at the beginning of a water intake system where water flows through filtration discs. Pressurized filtration systems require frequent backwash to be effective. However, many jurisdictions prohibit the return of backwash water back to rivers and/or lakes and so the backwash water must be discharged to a sewage system. This additional backwash system adds substantial costs for connecting to a sewer line.
3) Disc screens and rotational sheet filters remove aquatic organisms with certain restrictions and limitations. The system also requires disposal of the extracts.
4) Chemical injections with copper sulfate etc. to kill aquatic organisms. Chemical additive must be later removed to EPA acceptable limits. Both are costly expenditures.

In current art for the raw water and the wastewater pre-treatment, the flow first goes through bar rack that removes larger debris, then follows with grit removal, primary settling basin and fine screening before the flow is transferred to secondary treatment.

What is needed solution that performs traditional water/wastewater pre-treatment processes, including grit removal, primary settling basin and fine screening in fewer steps. Likewise, what is needed is a solution that eliminates equipment and time that is currently required for grit removal, primary basin, and fine screening by removing bed load, floating, and suspended particles. What is needed is to filter raw water without extraction of the targeted particles and organisms from the water source.

SUMMARY OF INVENTION

The invention is embodied by a flow-through treatment device. This device can be used for both water treatment ("raw water") and wastewater treatment ("sewage") solutions. Broadly, the flow-through filtration device comprises a rotating, perforated, horizontal tube. In operation, water or wastewater enters one end of the tube. As the tube rotates, a spiral blade mounted to the inside face of the tube pushes the water (or wastewater) along the length of the tube from one end to the other. As this happens, material that is bigger than the perforations stays in the tube and is moved through the tube by the spiral blade. Conversely, material that is smaller than the perforations passes through the perforations and falls into a wet well (or "chamber box") located underneath a length of the tube.

For raw water treatment, this flow-through filtration device does two important things. First, the device filters some of the raw water. Second, the device permits some of the raw water to by-pass the filter. This is an advantage because it eliminates having to provide separate waste disposal for the raw water bypassing stream. In addition, the flow-through filtration device can be adjusted vertically (up and down) to accommodate depth variations in raw water flow.

For wastewater treatment, the flow-through filtration device can separate sewage into three streams: a filtered stream, a fine particle stream, and a grit stream. Some of the advantages of this solution include (1) eliminating prior art steps in wastewater treatment, (2) providing continuous operation, (3) requiring smaller treatment area square footage than current art, (4) reducing odor control cost, and (5) requiring no chemical additive nor subsequent chemical neutralization.

BRIEF DESCRIPTION OF THE DRAWINGS

A clear understanding of the key features of the invention summarized above are referenced to the appended drawings that illustrate the method and system of the invention. It will be understood that such drawings depict preferred embodiments of the invention and, therefore, are not to be considered as limiting its scope regarding other embodiments that the invention is capable of contemplating. Accordingly:

FIG. 1A—Example of quagga mussel.
FIG. 1B—Example of colonial hydroids.
FIG. 1C—Example of didymo (rock snot).
FIG. 1D—Example of floating rock snot.
FIG. 1E—Example of colonial hydroids on inlet grate.
FIG. 2—Example of a typical canal raw water intake—plan view.
FIG. 3—Example of a typical canal raw water intake—(FIG. 2, section A-A).
FIG. 4 illustrates an embodiment of the invention mounted on a typical canal raw water intake—plan view.
FIG. 5 illustrates an embodiment of the invention mounted on a chamber box in operation—(FIG. 4, section A-A).
FIG. 6 illustrates the invention mounted on a chamber box is raised for maintenance—(FIG. 4, section A-A).
FIG. 7 illustrates an end view (section B-B of FIG. 4) of a filtration device embodiment mounted on a chamber.
FIG. 8 illustrates a plan view of a device mounted on a diversion channel.
FIG. 9 illustrates an end view of a filtration device embodiment in operation
FIG. 10 illustrates an end view of a filtration device embodiment raised up for maintenance.
FIG. 11 illustrates a side view of a filtration device embodiment.
FIG. 12 illustrates cross view of sections designated on FIG. 11.
FIG. 13 illustrates a plan view of wastewater inflow adapter embodiment.
FIG. 14 illustrates a side section view of wastewater inflow adapter embodiment.
FIG. 16 illustrates a side section view of an embodiment of a screen cylinder outflow adapter.
FIG. 17 illustrates an end view of an embodiment of a raw water outflow reducer.
FIG. 18 illustrates an end view of an embodiment of a wastewater outflow reducer.
FIG. 19 illustrates various embodiments of a perforated stainless steel screen cylinder.
FIG. 20 illustrates a waterproof cylinder bearing.
FIG. 21 illustrates a cylinder gear and driving gear.
FIG. 22 illustrates a sluice gate gear rod and driving gear.
FIG. 23 illustrates a gear axle.
FIG. 24 illustrates a stainless steel rotating helical spiral blade.
FIG. 25 illustrates a hydraulic nozzle injector.
FIG. 26A illustrates a flow diagram of a conventional wastewater treatment.
FIG. 26B illustrates a flow diagram of an embodiment of the invention installed in a wastewater treatment application.
FIG. 27—illustrates an embodiment mounted on a raw water canal intake structure.
FIG. 28—illustrates an embodiment mounted on a wastewater well.
FIG. 29 illustrates an embodiment of a hydraulic profile of a rotation screen cylinder with no backwater.
FIG. 30 illustrates an embodiment of a hydraulic profile of a rotation screen cylinder with outlet to downstream canal.

FIG. 31 illustrates an embodiment of a hydraulic profile of a rotation screen cylinder with spiral blade and outlets to downstream canal.
FIG. 32 illustrates an embodiment of a hydraulic profile of a rotation screen cylinder with an inlet adaptor and an outlet reducer for sewer flow.
FIG. 33 illustrates an embodiment of a canal water flow velocity distribution.
FIG. 34 illustrates an embodiment of a blade impulse to row stroke.

DETAILED DESCRIPTION OF THE PREFERRED EMBODIMENTS

General Description of the Flow-Through Filter

Figure 15:
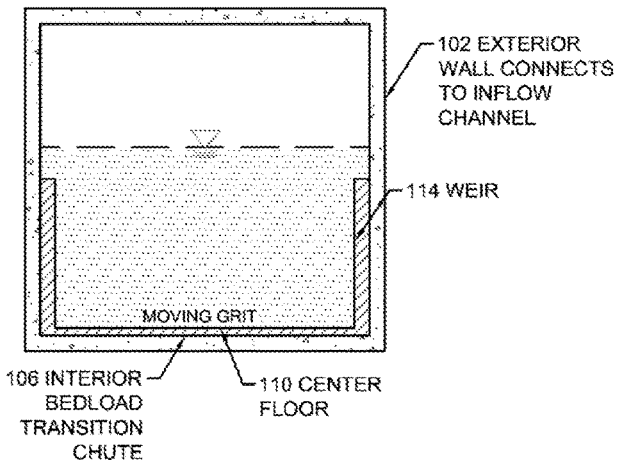
FIG. 15 illustrates cross view of the sections designated on FIG. 14.
Figure 15:
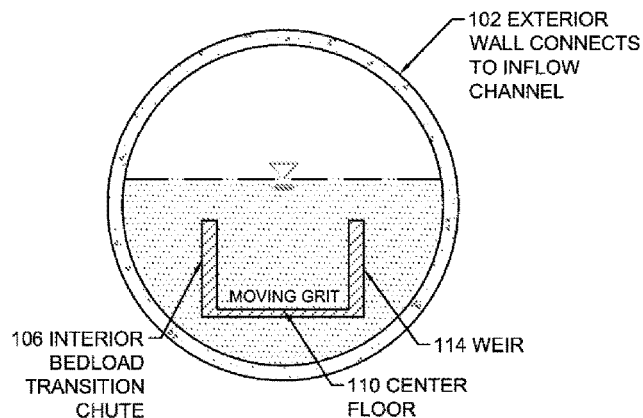
Figure 15:
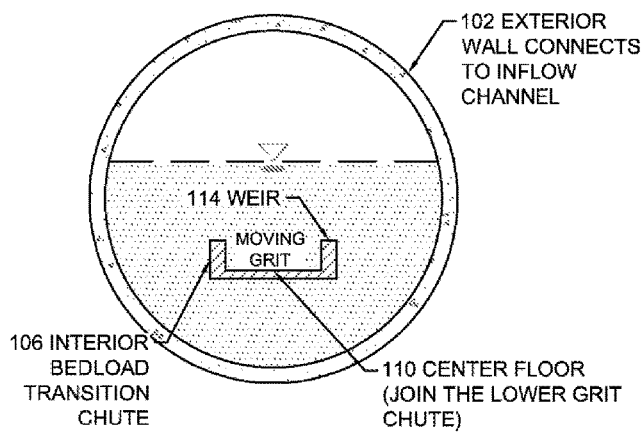

An embodiment of the preferred flow-through filter 10 is shown in FIG. 11. As shown, the preferred flow-through filter 10 comprises a horizontally oriented tube 14. The tube 14 comprises a plurality of perforations 16. The tube 14 is rotatable about a central longitudinal axis 18. A rotating tube 14 can be accomplished in many ways. It is preferred to rotate the tube 14 by mounting a wheel gear 20 on either end of the tube 14 as shown in FIG. 11. A pair of drive gears 22, driven by an electric motor can be used to drive the wheel gears 20.

It is preferred to construct the tube 14 from stainless steel and or other synthetic composite material. T-316 stainless steel is presently preferred. Perforations 16 can be as small as 5 microns. Optionally, multilayer cylindrical extruder screens up to five layers can be fabricated. Perforated cylindrical extruder screens with structural strength should be used for the most outer cylinder regardless of the number of the screen layer is to be used. Optionally, tube 14 surfaces can be coated with ultra-high-molecular-weight polyethylene for improved performance and reduced wear. For example, the new SLIPS-enhanced steel is extremely durable and anti-fouling. SLIPS is known in the art as an electrodeposited nano porous tungsten oxide film that has a broad range of applications.

A first end 26 of the tube 14 is preferably in fluid communication with a fluid source 30, such as a canal. As discussed below, a second end 28 of the tube 14 can also be in fluid communication with the same fluid source 30 (e.g., when operating as a by-pass for raw water). Or, the second end 28 may be filtered out waste from fluid source 30 (e.g., when operating in a wastewater environment).

A blade 38 is preferably mounted to an inside face 42 of the tube 14. The blade 38 is preferably a spiral blade oriented to add energies to the passing canal flow and to push material inside the tube along the length of the tube from the first end 26 to the second end 28 when the tube rotates. An example of the preferred blade 38 is shown in FIG. 24.

Turning to FIG. 12C, a chamber box 46 is located underneath the tube 14. For the purposes of this specification a "chamber box" is a vessel for holding fluid. Fluid from the fluid source 30 flows into the first end 26 and at least some of the fluid flows through the perforations 16 into the chamber box 46. The filtered water in the chamber box 46 can then be pumped for advanced treatment.

In operation, raw water or wastewater flows into the first end of the tube and seeps through the perforations 16 into the chamber box (wet well) 46. Floating and suspending particles and aquatic organisms that do not fit through the perforations 16 are retained inside the tube 14 and are pushed along by the blade 38. These retained solids 50 are preferably captured in an upper chute 54.

The upper chute 54 preferably runs lengthwise inside the tube 14. In order to capture the retained solids 50, a plurality of nozzles 58 are oriented on a water pipe 62 located above the tube 14. The plurality of nozzles 58 are oriented to direct water onto the tube 14. Water sprayed from the plurality of nozzles 58 redirects the retained solids 50 onto the upper chute 54. Preferably, upper chute 54 comprises a convex cross section and comprises a slope between the first end and the second end so that the retained solids are washed down the upper chute 54 to the fine particle outflow 56. See FIGS. 16-18. From there the fine particle outflow (i.e., retained solids 50) and the bypassed raw water flow return to the downstream water source body 30. For wastewater, as shown in FIG. 26B and FIG. 28, the fine particle outflow (i.e., retained solids 50) is discharged to sludge process (e.g., gravity thickener), the grits are screened out to a grit hopper cart, while excess flows are returned to sewage inflow.

Raw Water Embodiment

In a raw water environment, the flow-through filter 10 can separate the raw water in at least three ways. First, it filters the raw water via the perforations 16. Second, it captures the retained solids 50 in the upper chute 54 as described above. Third, and most significantly, it allows some of the raw water to "flow-through" the flow-through filter 10 and returns to the downstream water source body 30

As shown in FIG. 11, raw water can "flow through" without extracting the targeted particles and aquatic organisms of a defined size because the tube 14 can preferably be raised or lowered so that fluid from the body of raw water can flow into the first end and out through the second end, even though some of the fluid flows through the perforations 16 into the chamber box.

This "flow through" functionality can be accomplished in at least two ways. One way is for a person of skill in the art to size the perforations relative to the length of the tube so that not all the raw water that enters the tube flows through the perforations 16 before reaching the second end. A person of skill in the art would adjust the size and number of perforations 16 depending on the intake flow rate and size of targeted particles and/or aquatic organisms' diameters. Another way is to mount the flow-through filter 10 to a pair of height-adjustable sluice gates 66 that are connected to the first and second ends of the tube 14 respectively as shown in FIG. 11. Using both ways in combination is preferable.

Special sluice gates are not needed. Simply cutting a center hole in a pair of typical sluice gates 66 to accommodate each end of the tube 14 is preferable. A sluice gate rod 70 is mounted on the sluice gates 66 as shown in FIG. 12. A sluice gate drive gear 74 powered by electric motor and a gear axle (FIG. 11) can be used to raise and lower this pair of sluice gates 66 in tandem.

The tube 14 can be connected to the center hole of the sluice gates 66 via a waterproof cylinder bearing 80 (FIGS. 11 and 12, and FIG. 20). The outside circumference of cylinder bearing 80 can be connected to a steel tube welded to the sluice gate and the tube 14 can be fastened and connected to the inside of the cylinder bearing 80. A cylinder wheel gear 20 (FIGS. 11 and 12) can be mounted on the perforated tube 14. Drive gear 22 (FIGS. 11 and 12) can be mounted on a gear axle. Via electric motor, drive gear 22 drives the cylinder wheel gear 20, which rotates the tube 14. The cylinder bearings 80 allow the tube 14 to rotate 360° and induce angular velocity (FIG. 12) to the flow. In this way the tube 14 rotates along central longitudinal axis 18.

This arrangement allows an operator to raise and lower the height of the rotatable, perforated tube 14 relative to the surface of the body of raw water 30. The sluice gates 66 are synchronized to move up and down according to the target canal water surface elevation by a motor-powered gear rod 70 (FIG. 11, 12 and FIG. 22) and a canal water elevation sensor gauge.

In this way, the entire flow-through filter 10 can be adjusted vertically so that the desired amount of raw water flows into the first end 26 and out through the second end 28. This is a significant feature that provides safe passage for fish, eliminates excess separation processing, and reduces system downtime. Among other things, floating debris and aquatic organisms can continue to move downstream of the river or the canal. In addition, raising and lowering the sluice gates 66 can enable easy maintenance of the flow-through filter 10.

Turning now to FIGS. 4, 5, 6, and 7, the flow-through filter 10 can be placed inside a chamber box 46 that is mounted on a water intake rack structure 74 (FIG. 2) with the racks removed. FIG. 5 shows the flow-through filter 10 in operating position while the flow-through filter 10 is up for maintenance as shown on FIG. 6. FIG. 8 shows the flow-through filter 10 installed on a diversion canal without the burden of discharging remnants to a sewage system.

In raw water application, A gear axle connects to the sluice gate drive gears (FIGS. 11, 12, and 23) on both ends to adjust the sluice gates. The screen cylinder elevates with the canal's fluctuating water surface elevation. It can be operated manually or automatically by a motor driven through the gear-axle that synchronizes the adjustment of two sluice gates elevating simultaneously.

A stainless steel rotating helical spiral blade (FIGS. 11, 12, and FIG. 24) is welded to the inner surface of the screen cylinder. The spiral blade induces the flow angular velocity (FIG. 12) to longitudinal energy, enabling the flow to exit downstream of the screen cylinder. The spiral blade acts like a paddle that speeds up the flow. It turns and diverts the rotating screen's angular velocity to longitudinal velocity toward the outlet of the screen cylinder. The spiral blade moves debris away from the screen section to the flow-through filter 10 outlet. (See, FIGS. 16-18.)

A cylinder wheel gear 20 (FIGS. 11 and 12, and FIG. 21) is mounted on the screen next to each cylinder bearing.

A separate gear axle (FIG. 23) is also used for the rotation of the screen cylinder by connecting both ends to the screen cylinder's driving gears (FIGS. 11, 12, and 21). A motor drives the gear axle that drives the cylinder wheel gear to rotate the screen cylinder.

A tilt upper fine particle chute (FIGS. 11, 12, and 16) is welded to the sluice gates and is extended inside the screen cylinder to the flow-through filter 10 outlet.

A series of water jet nozzles (FIGS. 11, 12, and 25) are installed along a water pipe (FIGS. 11 and 12) directly over the screen cylinder that wash debris and organisms off the screen to the upper fine particle chute below and drains downstream away from the screen cylinder opening. The external spray bar with a high pressure nozzle injects water to remove any debris intercepted at the screen holes.

For raw water, a transition reducer-channel 78 (FIGS. 16, 17, and 18) is mounted on the downstream sluice gate that receives outflow from the screen cylinder and drains through-flows back to canal. The purpose of the transition reducer channel 78 is to increase the reduced flow's energy (depth plus velocity head) to be greater than the down stream's flow energy. A initial cross-section 82 of the transition reducer channel 78 matches the size and shape of the second end 28 of flow-through filter 10 (screen cylinder). An outflow cross section 86 of the transition reducer channel 78 is narrower than the initial cross-section 82 the other end.

The specific dimension and the length of the eccentric cone shaped transition reducer channel can be sized based on the flow conditions of the canal and the percentage of intercepted flow to be returned to the canal.

A complete embodiment mounted on a canal raw water intake is shown on FIG. 27.

Maintenance

FIG. 9 shows the flow-through filter 10 in operating position while FIG. 10 shows the flow-through filter 10 is up for maintenance.

Sizing Screen Cylinder Interior Diameter

In general, canals were designed at an average velocity of 0.75-0.9 m/s (2.5-3.0 fps) to prevent sedimentation when the silt load of the flow is low and growth of vegetation. Most canals were designed with a trapezoidal section, its flow velocity distribution can be seen on FIG. 33).

Intake structures were constructed so that the intake rack slopes matches the canal bank slope and the flow velocity is around 50% of the canal mean velocity. The screen cylinder intercepts approaching flow at a 1:1 angle (1 longitudinal and 1 horizontal) that expands from both sides of the cylinder opening, which results in flow with a higher velocity at the entrance of the cylinder. The flow exits the chamber box at a 4:1 angle (4 longitudinal and 1 horizontal).

Addressing Energy Loss Through the Flow-Through Filter 10

The chamber box that is mounted on the intake structure disrupts the canal hydraulics. The amount of possible flow diversion and the energy losses through the flow-through filter 10 can be calculated based on two control sections along the canal for hydraulic analysis and size the screen cylinder's dimensions. The first cross-section is located downstream of the chamber box where outflows from the screen cylinder merge with the main body of the canal flow. The second cross-section is located upstream of the chamber box where the canal flow is undisturbed by the chamber installation.

For raw water application, there are four categories of energy loss resulting from the filtration chamber. This energy loss must be added back to the moving fluid in order to discharge the flow from the chamber outlet into the downstream canal. If the energy loss is not added back to the water inside of the screen cylinder, then the water will not be able to exit the screen cylinder and will induce water entering the chamber box from both ends of the screen cylinder.

Flow that seeps through the screen cylinder mesh, into the chamber, and to the pumps does not cause loss to the flow-through water except the friction loss through the section of rotation screen.

For water elevations in a chamber box and/or a wet well lower than the bottom of the screen cylinder, orifice flow equations can be applied to each mesh opening area for the amount of flow draining into the chamber box/wet well.

The four energy losses through the flow-through filter 10 are:

1) entrance loss when canal water enters into the screen cylinder.

$Len = Ke*V_1^2/2\ g$; $Ke$ is entrance loss: $V_1$ is velocity at cylinder entrance 2) friction loss when water passes through the rotating screen.

$Lf = Sf*L$; $Sf$ is the friction slope of the cylinder and $L$ is the cylinder length 3) contraction loss when water flows from the screen cylinder to the reducer.

$Lc = Kc*V_2^2/2\ g$; $Kc$ is contraction loss coefficient: $V_2$ is velocity at cylinder exit 4) exit loss when water flows from the screen reducer back to the canal.

$$Lex = Kex*V_4^2/2g$$

Total Energy Loss $(ELt) = Len + Lf + Lc + Lex$

To ensure the water flows through the cylinder, the Energy Asserts (Ea) by the spiral blade must be larger than the Total Energy Loss through the chamber box.

$Ea > ELt$

The energy asserted by the spiral blade is similar to the energy asserted by rowing paddles on a canoe moving downstream (FIG. 34). For reference, in this example, force is the push exerted by water. Force is usually expressed in pounds (lbs) or tons.

Newton's third law of motion where every action drives a reaction explains how a boat accelerates. When a rower moves water one way with each oar, the boat moves the other way. The momentum a rower puts into the water will be equal and opposite to the momentum acquired by the boat (=mass×velocity).

The amount of force and the length of time that force is applied to an object will change its momentum. Force is the rate at which momentum changes with respect to time (F=dp/dt). Note that if p=mv and m is constant, then F=dp/dt=m*dv/dt=ma.

Momentum is the product of the mass and velocity of an object. It is a vector quantity, possessing a magnitude and a direction. If m is an object's mass and vis its velocity (also a vector quantity), then the object's momentum is: P=mv, p=mv. In SI units, momentum is measured in kilogram meter per second.

A motor rotates the screen cylinder and the spiral blade welded inside the screen cylinder. When the spiral blade contacts the water surface, and draws the water downward, it also draws the water toward the downward force and induces a cross section water movement. The spiral blade turns the angular velocity perpendicularly to the blade angle crossing the screen cylinder, which turns to longitudinal velocity once the rotating blade reaches the surface. The spiral blade and the cylinder screen are stationary and fixed. The resulting relative velocity is the flow velocity in opposite direction.

Many studies have documented the momentum, force, and resulting velocities based on the paddle width and length and the number of strokes per minutes. Using these studies, the required width of the spiral blade and the number of blade coils per unit length, and the screen rotation speed can be defined.

For precise engineering design, the force imposed on water and resulting velocities by various spiral blades of differing blade width and number of coils in a fixed length can be derived in lab-scaled simulations.

In sum, a turning spiral blade changes the rotational angular velocities that transition into longitudinal velocity through the outflow reducer. (FIGS. 16 and 17.) The increasing longitudinal velocity increases the exit flow energy, which allows passing flows to return to a natural stream.

Wastewater (Sewage) Embodiment

In a wastewater treatment embodiment, the flow-through filter 10 operates in some ways just like the raw water embodiment. For example, the flow-through filter 10 is installed in a chamber box over a wet well) (FIGS. 9 and 10). The wastewater enters the first end 26 and gets pushed to the second end 28 by the spiral blade 38 and the gravity force. The solids retained by the tube 14 (the retained solids) get flushed into the upper chute 54 by the plurality of nozzles 58 above the tube 14. The flow-through filter 10 should preferably be sized to accommodate the incoming maximum peak hour flow flowing at 75% of the screen cylinder's interior diameter.

However, unlike the raw water embodiment, none of the wastewater "flows through" the second end 28 of the tube 14. That is, almost all of the filtered wastewater flows into the wet well before it reaches the second end 28 of the tube 14. At the second end 28, a transition reducer-channel (FIG. 16, 78 and FIG. 18, 24) is mounted on the downstream sluice gate 66. The transition reducer-channel receives outflow of the retained solids from the upper chute and the heavier grits from a lower chute 90.

The purpose of the lower chute 90 is to capture the heavier grits flowing as a bed load at the first end 26 of the tube 14. In order to capture the heavier grits in the lower chute 90, a wastewater inflow adapter (FIGS. 13 and 14) is preferably added to the inlet of the flow-through filter 10 (FIG. 11). An inflow adapter 94 is preferably located between the sewage inflow source (e.g. channel) 98 and the flow through filter 10. The purpose of the inflow adapter 94 is to transition the flow from the sewage source 98 into the flow-through filter 10. In addition, the inflow adapter is configured to direct the heavier grits of the bed load of the sewage source 98 into the lower chute 90.

The inflow adapter 94 principally comprises two elements: an exterior transition wall 102 and an interior bedload transition chute 106. The exterior transition wall 102 of the inflow adapter 94 transitions from the shape of the inflow channel to circular shape matching the steel tube of the flow-through filter 10 (screen cylinder). For example, as shown in FIG. 15A, the first cross-section of the exterior transition wall 102 matches cross-section of the sewage inflow source 98. Likewise, the last cross-section of the exterior transition wall 102 matches the cross-section of the flow-through filter 10 as shown in FIG. 15C. It is preferred that the exterior transition wall 102 uniformly transition from the first cross-section to the last cross-section as shown in FIGS. 15A-15C. In addition, as shown in FIG. 14, the bottom of the exterior transition wall 102 can be sloped to increase the flow rate into the flow-though filter 10.

The interior bedload transition chute 106 is preferably a channel shaped transition. The interior bedload transition chute 106 preferably comprises a center floor 110 and a pair of vertical walls or wiers 114 on either side. The interior bedload transition chute 106 of the inflow adapter 94 transitions from the shape of the inflow channel at the beginning to the shape of the lower chute 90 at the end. For example, as shown in FIG. 15A, the first cross-section of the interior bedload transition chute 106 matches cross-section of the sewage infrom source 98. Likewise, the last cross-section of the exterior transition wall 102 matches the cross-section of the lower chute 90 as shown in FIG. 15C. It is preferred that the interior bedload transition chute 106 uniformly transition from the first cross-section to the last cross-section as shown in FIGS. 15A-15C. In this way, the interior bedload transition chute 106 has the beginning section of full width and height matching the inflow channel transitions to the same wall height and width of the lower grit chute.

As shown in FIG. 14, it is preferred to uniformly transition the height of the weirs 114 from beginning to end (i.e., from FIG. 15A to FIG. 15C). As this transition occurs, wastewater will increasingly flow over the weirs 114 and onto the inflow adapter floor below as the interior bedload transition chute 106 transitions into the lower chute 90.

The lower grit chute 90 runs the length of the flow-though filter 10 as shown in FIG. 11. The lower grit chute 90 should have a slope more than twice the inflow channel, but no less than 1%. The lower grit chute 90 should have a width at least 210% of the largest grit diameter and with a wall height not lower than ⅔ of the largest grit. The lower grit chute 90 drains over a tilted grit screen that collects grit for disposal and returns the liquid to the inlet of the flow-through filter 10.

With the selected screen mesh size, filtered flow is ready for further treatment. Filtered fine particles are immediately washed out to the fine particle stream. Preconcentration of bed load and flow through hydraulic configuration The lower grit chute 90 should have brackets support welded to the sluice gate steel tube at both ends. In addition, there are preferably intermediate brackets connecting the lower grit chute 90 to the upper fine particle chute 54 to strengthen the structural support of the upper fine particle chute and the lower grit chute.

The connection gap at the interior bedload transition chute 106 and the lower grit chute 90 should not be more than ⅓ of the diameter of the smallest grit anticipated.

The sewage inflow adaptor (FIGS. 13, 14, and 15) concentrates heavier grit prior to the sewage entering the screen cylinder and conveys it through the lower tilt chute to the grit outflow for disposal.

The upper fine particles chute 54 drains particles larger than perforations 16 for sludge process.

For wastewater treatment requiring alum additive or coagulation and flocculation additions, the additives can be injected in the manholes of the sewer interception leading to the wastewater treatment plant.

As shown, the flow-through filter 10 is a perforated screen cylinder (FIG. 11, 16 and FIG. 12, 16) with an outer chamber box (FIG. 12, 46). In operation, as sewage flows through the inner tube of the screen cylinder (filter 10), water seeps out of the sides of the screen cylinder into the outer chamber and falls into the wet well. Floating and suspending particles and aquatic organisms of a defined size are intercepted by the screen because they are too large to seep through the sides of the screen cylinder. The remnants intercepted by the screen are washed to upper fine particle chute (FIG. 11, 54) and are discharged as untreated sludge. The heavier grits flowing as bed load is concentrated in the inflow adapter 94 (FIGS. 11, 13, and 14) attached in front of the sluice gate and continues through the lower grit grit chute (FIGS. 13 and 14, 90) and are discharged to a grit basket for disposal.

In sum, this embodiment of the flow-through filter 10 can separate incoming sewage to three outflow streams, (1) targeted floating and suspending waste, (2) heavier grit, and (3) filtered flow for further treatment. Thus, the flow-through filter 10 can replace one or more traditional wastewater treatment stages. As shown in FIG. 26B, the flow-through filter 10 can be installed after a bar rack or traveling screen that removes large debris. With addition of an inflow adapter 94, a lower grit chute 90 and an outflow reducer, the flow-through filter 10 can eliminate traditional grit removal 140, primary basin/primary clarifier 148 and fine screening 152. Mounting the flow-through filter 10 on a wet well with the inflow and outflow adaptor as shown on FIG. 28 can replace traditional grit removal, primary clarifier, and fine screening processes as shown in FIG. 26A. As shown, this wastewater treatment system reduces the real estate square footage to treat the wastewater, it reduces odor, and it reduces control capital and operation costs.

Screen Selection.

In the current common process, most grit removal has 90% or higher efficiency for removing. Residuals are removed by settling in a primary basin.

Fine screens are used to remove particles that may cause maintenance issues for processing equipment and/or operational problems in the treatment process. In wastewater treatment facilities, fine screening filtration is used after the alum addition and primary settling basin. Fine screen openings typically range from 0.06 to 0.25 inches (mesh 3 to 14; 1410 microns to 6730 microns).

Fine screens with 0.2 mm (0.079 inch) apertures can achieve the same removal rates as the traditional primary basin and fine screening on a much smaller footprint without a primary basin. 0.2 mm fine screens can significantly lower investment costs. The invention is installed over a wet well that receives filtered sewage.

The flow-through filter 10 preferably receives wastewater after rack screening can achieve 100% efficiency of grit removal.

The wet well is preferably connected to a lift station that pumps the filtered sewage to the next treatment process.

The filtered out fine particles are preferably drained to a sludge thickener; the heavier grit is washed out to perforated collection baskets and the sewage is returned to the inlet of the flow-through filter 10.

Hydraulics

FIG. 29—Hydraulic Profile of a Rotation Screen Cylinder with no backwater. This figure demonstrates no additional energies are required for a free outfall situation.

FIG. 30—Hydraulic Profile of a Rotation Screen Cylinder with Outlet to Downstream Canal. This figure demonstrates flows into the flow-through filter 10 from both ends of the cylinder screen.

FIG. 31—Hydraulic Profile of a Rotation Screen Cylinder with Spiral Blade and Outlets to Downstream Canal. This figure demonstrates additional energies are added for the returning flow to the canal.

FIG. 32—Hydraulic Profile of a Rotation Screen Cylinder with an inlet adapter and outlet reducer for wastewater. The sewage is processed to three streams (1) filter water, (2) wet fine particles, and (3) flow with grit.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

The invention claimed is:

1. A flow through filtration device comprising,
    a tube comprising a plurality of perforations, the tube oriented horizontally, and the tube rotatable about a central longitudinal axis,
    a first end of the tube comprising an inlet connected to an inflow adapter in fluid communication with a first location of an originating fluid source,
    a second end of the tube comprising an outlet connected to an outflow reducer in fluid communication with a second location of the originating fluid source,
    a spiral blade mounted to an inside face of the tube, the spiral blade oriented along a length of the tube from the first end to the second end and configured to impart angular velocity to fluid flowing through the tube towards the second end for discharge through the outlet, and
    a chamber box located underneath at least a portion of the length of the tube, wherein fluid from the originating source flows into the first end and at least some of the fluid flows through the perforations into the chamber box and any remaining fluid flows out through the outlet.

2. The flow through filtration device of claim 1 further comprising,
    a first sluice gate connected to the first end,
    a second sluice pate connected to the second end, and
    wherein the first and second sluice gates are configured to be raised and lowered by the lifting mechanism in tandem to adjust the vertical position of the tube relative to a surface of the originating fluid source.

3. The flow through filtration device of claim 1 further comprising a water pipe located above the tube, the water pipe comprising a plurality of nozzles oriented to direct water onto the tube.

4. The flow through filtration device of claim 3 further comprising an upper chute, the upper chute running lengthwise inside the tube underneath the plurality of nozzles, the upper chute comprising a convex cross section and comprising a slope between the first end and the second end.

5. The flow through filtration device of claim 1 further comprising a lower chute, the lower chute running lengthwise inside the tube, the lower chute comprising a convex cross section and comprising a slope between the first end and the second end.

6. The flow through filtration device of claim 5 wherein the inflow adapter comprising an inflow channel and a telescoping longitudinal weir,
    the inflow channel comprising a convex cross-section for directing fluid into the first end of the tube, the telescoping longitudinal weir positioned inside the inflow channel, the telescoping longitudinal weir comprising a convex cross-section oriented to direct fluid comprising grit into the lower chute.

7. A raw water treatment system comprising,
    a body of raw water,
    a tube comprising a plurality of perforations, the tube oriented horizontally, and the tube rotatable about a central longitudinal axis,
    a first end of the tube comprising an inlet connected to an inflow adapter in fluid communication with a first location of the body of raw water,
    a second end of the tube comprising an outlet connected to an outflow reducer in fluid communication with a second location of the body of raw water,
    a spiral blade mounted to an inside face of the tube, the spiral blade oriented substantially along a length of the tube from the first end to the second end and configured to impart angular velocity to fluid flowing through the tube towards the second end for discharge through the outlet, and
    a chamber box located underneath at least a portion of the length of the tube,
    wherein fluid from the body of raw water flows into the first end and at least some of the fluid flows through the perforations into the chamber box, and any remaining fluid flows out through the outlet.

8. The raw water treatment system of claim 7 further comprising,
    a first sluice gate connected to the first end, a second sluice gate connected to the second end, and
a lifting mechanism connected to the first and second sluice gates,
wherein the first and second sluice gates are configured to be raised and lowered in tandem by the lifting mechanism to adjust the vertical position of the tube relative to a surface of the body of raw water.

9. The raw water treatment system of claim 7 further comprising a water pipe located above the tube, the water pipe comprising a plurality of nozzles oriented to direct water onto the tube.

10. The raw water treatment system of claim 9 further comprising an upper chute, the upper chute running lengthwise inside the tube underneath the plurality of nozzles, the upper chute comprising a convex cross section and comprising a slope between the first end and the second end.

11. A wastewater treatment system comprising,
a filtration zone configured to receive a source of wastewater, the filtration zone configured to separate a source of wastewater into three distinct waste streams: a fine particle stream, a grit stream, and a filtration zone effluent stream,
the filtration zone comprising,
a tube comprising a plurality of perforations, the tube oriented horizontally, and the tube rotatable about a central longitudinal axis,
a first end of the tube comprising an inlet in fluid communication with the source of wastewater,
a second end of the tube comprising an outlet in fluid communication with the source of the wastewater,
a spiral blade mounted to an inside face of the tube, the spiral blade oriented along a length of the tube from the first end to the second end and configured to impart angular velocity to fluid flowing through the tube towards the second end for discharge through the outlet,
a chamber box located underneath at least a portion of the length of the tube, and
a lower chute running lengthwise inside the tube, the lower chute comprising a convex cross section and comprising a slope between the first end and the second end,
wherein fluid from the source flows into the first end and at least some of the fluid flows through the perforations into the chamber box, and any remaining fluid flows out through the outlet.

12. The wastewater treatment system of claim 11 further comprising,
a first sluice gate connected to the first end,
a second sluice gate connected to the second end, and a lifting mechanism connected to the first and second sluice gates,
wherein the first and second sluice gates are configured to be raised and lowered in tandem by the lifting mechanism to adjust the vertical position of the tube.

13. The wastewater treatment system of claim 11 further comprising a water pipe located above the tube, the water pipe comprising a plurality of nozzles oriented to direct water onto the tube.

14. The wastewater treatment system of claim 13 further comprising an upper chute, the upper chute running lengthwise inside the tube underneath the plurality of nozzles, the upper chute comprising a convex cross section and comprising a slope between the first end and the second end.

15. The wastewater treatment system of claim 11 further comprising,
an inflow adapter connected to the first end, the inflow adapter comprising an inflow channel and a telescoping longitudinal weir, and
the inflow channel comprising a convex cross-section for directing fluid into the first end of the tube, wherein the telescoping longitudinal weir is positioned inside the inflow channel and comprises a convex cross-section oriented to direct fluid comprising grit into the lower chute.

* * * * *